United States Patent
Sun et al.

(10) Patent No.: US 12,512,515 B2
(45) Date of Patent: Dec. 30, 2025

(54) ELECTROLYTE COMPOSITIONS FOR LITHIUM ION BATTERIES

(71) Applicant: A123 Systems LLC, Novi, MI (US)

(72) Inventors: Liyuan Sun, Acton, MA (US); Xiaobo Li, Fort Lee, NJ (US); Mengqing Xu, Middleton, WI (US); Derek Johnson, Fort Collins, CO (US); Taehwan Yu, Burlington, MA (US); Kate Digan, Bedford, MA (US); Connor Tomshack, Lexington, MA (US)

(73) Assignee: A123 SYSTEMS LLC, Novi, MI (US)

( * ) Notice: Subject to any disclaimer, the term of this patent is extended or adjusted under 35 U.S.C. 154(b) by 504 days.

(21) Appl. No.: 17/133,404

(22) Filed: Dec. 23, 2020

(65) Prior Publication Data

US 2022/0200053 A1 Jun. 23, 2022

Related U.S. Application Data

(60) Provisional application No. 62/959,774, filed on Jan. 10, 2020.

(51) Int. Cl.
*H01M 10/0569* (2010.01)
*H01M 10/0525* (2010.01)
*H01M 10/0567* (2010.01)
*H01M 10/0568* (2010.01)

(52) U.S. Cl.
CPC ... *H01M 10/0569* (2013.01); *H01M 10/0525* (2013.01); *H01M 10/0567* (2013.01); *H01M 10/0568* (2013.01); H01M 2300/0042 (2013.01)

(58) Field of Classification Search
CPC ......... H01M 10/0525; H01M 10/0567; H01M 10/0568; H01M 10/0569
See application file for complete search history.

(56) References Cited

U.S. PATENT DOCUMENTS

| 10,290,900 B2 | 5/2019 | Mizuno et al. |
| 2007/0166617 A1* | 7/2007 | Gozdz ................ H01M 4/5825 429/231.95 |

(Continued)

FOREIGN PATENT DOCUMENTS

| CN | 104781975 A | 7/2015 |
| CN | 105591149 A | 5/2016 |

(Continued)

OTHER PUBLICATIONS

ISA Korean Intellectual Property Office, International Search Report and Written Opinion Issued in Application No. PCT/US2020/066974, Apr. 16, 2021, WIPO, 14 pages.

(Continued)

*Primary Examiner* — Osei K Amponsah
(74) *Attorney, Agent, or Firm* — McCoy Russell LLP (57) ABSTRACT

Systems and methods are provided for using electrolytic compositions in lithium ion batteries. In one example, an electrolytic composition may include vinylene carbonate, fluoroethylene carbonate, 1,3-propane sultone, ethylene sulfite, and a conducting salt including no less than 80 mol % of lithium bis(fluorosulfonyl)imide. In this way, a capacity retention of the lithium ion battery may be maintained, such as during high-temperature storage at 100% state of charge.

13 Claims, 4 Drawing Sheets

(56) References Cited

U.S. PATENT DOCUMENTS

| | | | | |
|---|---|---|---|---|
| 2010/0018034 | A1* | 1/2010 | Miyasaka | H01M 4/505 |
| | | | | 29/623.1 |
| 2012/0258357 | A1* | 10/2012 | Kim | H01M 10/052 |
| | | | | 429/199 |
| 2014/0342241 | A1* | 11/2014 | Lim | H01M 4/525 |
| | | | | 429/331 |
| 2016/0149263 | A1 | 5/2016 | Hallac et al. | |
| 2016/0164143 | A1 | 6/2016 | Sawa et al. | |
| 2018/0123172 | A1 | 5/2018 | Katsuyama | |
| 2019/0181494 | A1 | 6/2019 | Maeda et al. | |
| 2019/0214640 | A1* | 7/2019 | Salem | H01M 4/134 |
| 2019/0296398 | A1 | 9/2019 | Burkhardt et al. | |
| 2019/0379087 | A1 | 12/2019 | Oh et al. | |

FOREIGN PATENT DOCUMENTS

| | | |
|---|---|---|
| EP | 2860812 A1 | 4/2015 |
| EP | 3316381 A1 | 5/2018 |
| JP | 2002170575 A | 6/2002 |
| JP | 2004127543 A | 4/2004 |
| JP | 2004281073 A | 10/2004 |
| JP | 2015213016 A | 11/2015 |
| JP | 2016048624 A | 4/2016 |
| JP | 2016071998 A | 5/2016 |
| JP | 2016105394 A | 6/2016 |
| JP | 2016146329 A | 8/2016 |
| JP | 2017021949 A | 1/2017 |
| JP | 2019169428 A | 10/2019 |
| KR | 20170009873 A | 1/2017 |
| KR | 20180106971 A | 10/2018 |
| KR | 20190050709 A | 5/2019 |
| WO | 2018169028 A1 | 9/2018 |

OTHER PUBLICATIONS

Japanese Patent Office, Office Action Issued in Application 2022-541952, Feb. 12, 2025, 11 pages.

Korea Intellectual Property Office, Office Action Issued in Application No. 10-2022-7027467, Jul. 8, 2025, 22 pages. (Submitted with Machine Translation).

Japan Patent Office, Office Action Issued in Application No. 2022-541952, Jul. 15, 2025, 9 pages. (Submitted with Partial Translation).

\* cited by examiner

ELECTROLYTE COMPOSITIONS FOR LITHIUM ION BATTERIES

CROSS REFERENCE TO RELATED APPLICATIONS

The present application claims priority to U.S. Provisional Application No. 62/959,774, entitled "ELECTROLYTE COMPOSITIONS FOR LITHIUM ION BATTERIES," and filed on Jan. 10, 2020. The entire contents of the above-identified application are hereby incorporated by reference for all purposes.

FIELD

The present description relates generally to electrolyte compositions for lithium ion batteries.

BACKGROUND AND SUMMARY

Lithium ion batteries, or lithium secondary batteries, have become increasingly popular as power sources for electric and hybrid electric vehicles. In lithium ion batteries, lithium ions travel back and forth between a cathode and an anode through an electrolytic medium, often a liquid electrolyte. In such electrolytes, one or more conducting salts are often included, such as lithium hexafluorophosphate ($LiPF_6$). However, use of $LiPF_6$ alone may present issues ascribed to the instability of $LiPF_6$ in the presence of moisture at elevated temperatures, where hydrogen fluoride (HF) may be generated and decay capacity of the lithium ion battery.

The inventors have identified the above problems and have determined solutions to at least partially solve them. In one example, a non-aqueous electrolytic solution including lithium bis(fluorosulfonyl)imide (LiFSI, $LiN(FSO_2)_2$), e.g., as a primary conducting salt, and at least four additives are provided. In some examples, the non-aqueous electrolytic solution may further include $LiPF_6$ as a secondary conducting salt. The non-aqueous electrolytic solution may be capable of reducing capacity decay and impedance growth of lithium ion batteries during high-temperature storage relative to use of $LiPF_6$ as the primary conducting salt.

In one example, an electrolytic composition may include vinylene carbonate (VC), fluoroethylene carbonate (FEC), 1,3-propane sultone (PS), ethylene sulfite (ES), and a conducting salt including no less than 80 mol % of LiFSI. In this way, a high capacity of the lithium ion battery including the electrolytic composition may be retained during high-temperature storage applications.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
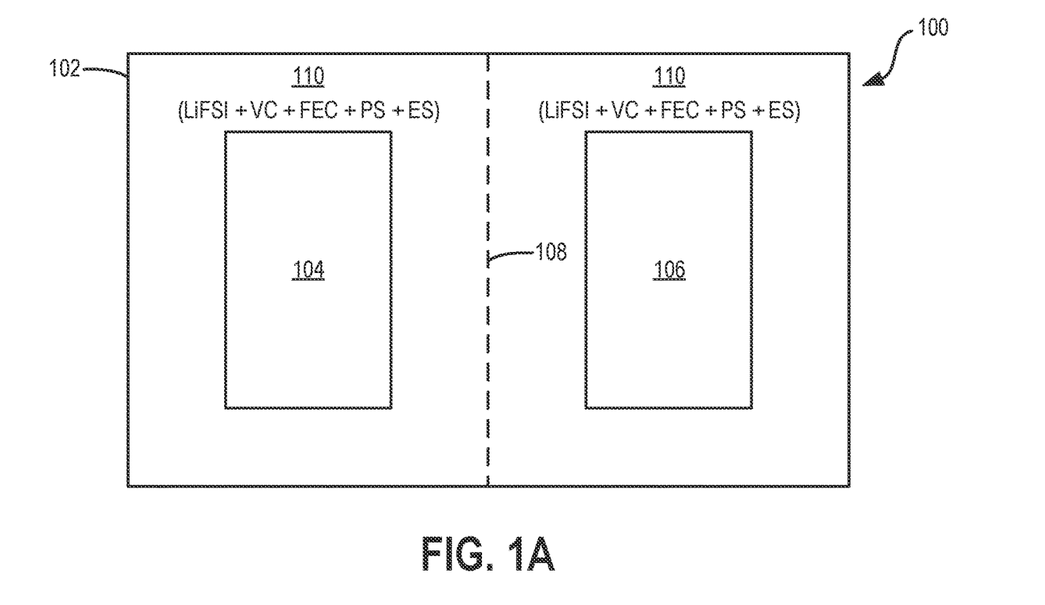
FIG. 1A shows a lithium ion battery including an exemplary electrolyte composition.

The following description relates to systems and methods for utilizing electrolyte compositions in lithium ion batteries, the electrolyte compositions including lithium bis(fluorosulfonyl)imide (LiFSI, $LiN(FSO_2)_2$) as a primary conducting salt and at least four further additive components. One exemplary lithium ion battery including an electrolyte composition is depicted in FIG. 1A, and relative component weights of various exemplary electrolyte compositions are graphically depicted in FIG. 1B. Plots depicting relative capacity and impedance of exemplary lithium ion batteries are depicted in FIGS. 2A and 2B, respectively, indicating that utilizing LiFSI as the primary conducting salt in the presence of vinylene carbonate (VC), fluoroethylene carbonate (FEC), 1,3-propane sultone (PS), and ethylene sulfite (ES) may better retain capacity and impedance under high-temperature (e.g., 60° C.) storage conditions at 100% state of charge (SOC). A method for forming the electrolyte composition for subsequent use in the lithium ion battery is presented in FIG. 3.

Referring now to FIG. 1A, a lithium ion battery 100 including a casing 102 enclosing a cathode 104 and an anode 106 immersed in an electrolyte 110 is depicted. Further, a separator 108 (e.g., a porous membrane separator) may be interposed between the cathode 104 and the anode 106 within the casing 102, such that physical contact between the cathode 104 and the anode 106 may be avoided. During charging of the lithium ion battery 100, lithium ions may flow from the cathode 104 to the anode 106. The electrolyte 110 may fill any empty volume within the casing 102 of the lithium ion battery 100 such that the electrolyte 110 may facilitate lithium ion transport between the cathode 104 and the anode 106, that is, across the separator 108.

The housing 102 may be a hermetically-sealed pouch or can. In some examples, the hermetically-sealed pouch may be composed of a pouch material which may be formed into a rectangular cross sectional shape, where sides thereof may be heat sealed. In additional or alternative examples, one or more of the sides of the housing 102 may be folded or rolled. Other materials may be used for the housing 102 as known to one of at least ordinary skill in the art.

The cathode 104 may include a cathode active material, such as a lithium insertion compound (e.g., a lithium intercalating compound or a lithium accepting compound). In some examples, the cathode active material may be a lithium iron phosphate, a lithium metal phosphate, a lithium bimetallic phosphate, a lithium multi-metallic phosphate, or another material including lithium and phosphate. It will be appreciated that other cathode active materials may be contemplated within the scope of the present disclosure.

The cathode 104 may further include a conductive additive and a binder. In some examples, the conductive additive may be carbonaceous. For example, the conductive additive may be carbon (e.g., carbon black) and a source thereof may include polyvinyl alcohol, polyvinyl butyral, sugar, another source or a combination of sources. In some examples, the binder may be a polymeric binder (e.g., polyvinylidene fluoride, polyvinylpyrrolidone, etc.). In some examples, the conductive additive and/or the binder may be a single material or a plurality of materials. The conductive additive and the binder are not particularly limited in composition and may be any known by one of ordinary skill in the art. Each of the cathode active material, the conductive additive, and the binder may be included in a cathode slurry which may be cast, dried, and calendered on a cathode current collector (e.g., an aluminum-based conductive substrate).

The anode 106 may incorporate an anode active material, such as one or more of lithium metal, graphite, graphene, silicon, silicon oxide, tin, lithium tin oxide, or another tin oxide. It will be appreciated that other anode active materials may be contemplated within the scope of the present disclosure. The anode active material may be included in an anode slurry which may be cast, dried, and calendered on an anode current collector (e.g., a copper-based conductive substrate). The anode 106 may further include a conductive additive and a binder. As an example, the conductive additive may be carbon black, and the binder may be polyvinylidene fluoride. In some examples, the conductive additive and/or the binder may be a single material or a plurality of materials, similar to that mentioned above for the cathode active material. The conductive additive and the binder are not particularly limited in composition and may be any known by one of ordinary skill in the art.

The separator 108 may have high porosity, excellent stability in the electrolyte 110, and excellent absorptive properties. Exemplary materials for the separator 108 may be selected from nonwoven fabrics or porous films made of polyolefins, such as polyethylene and/or polypropylene, or ceramic-coated polymer materials. Other materials may be used for the separator 108 as known to one of at least ordinary skill in the art.

The electrolyte 110 may be formed from an electrolyte composition including a conducting salt and at least four additives. As exemplified in FIG. 1A, each electrolyte composition provided herein may at least include LiFSI (e.g., as the conducting salt), VC, FEC, PS, and ES (e.g., as the at least four additives). Such a specific electrolyte composition may confer correspondingly specific technical benefits to the lithium ion battery 100. For example, it is herein recognized by the inventors that electrolytes (e.g., 110) including LiFSI combined with specific amounts of VC, FEC, PS, and ES additives dispersed in lithium ion batteries (e.g., 100) may slow capacity decay during high-temperature (e.g., 60° C.) storage at high SOC (e.g., 100%) without corroding the cathode current collector. Said another way, the use of LiFSI as the primary conducting salt along with the specific amounts of additives mentioned above represents an unexpected advantage in terms of moisture tolerance and improved battery performance over, for example, other methods that rely on lithium hexafluorophosphate (LiPF$_6$) as the primary conducting salt.

In additional or alternative examples, the electrolyte composition may further include LiPF$_6$ as a secondary conducting salt. In additional or alternative examples, the at least four additives may further include 1,3,2-dioxathiolane 2,2-dioxide (DTD). The LiPF$_6$ and/or DTD may be combined in specific ratios with LiFSI, VC, FEC, PS, and ES to balance various battery performance benefits in the lithium ion battery 100.

The conducting salt may include one or both of a primary conducting salt and a secondary conducting salt. In some examples, the primary (e.g., majority) conducting salt may be LiFSI and the secondary (e.g., minority) conducting salt may be LiPF$_6$.

However, in other examples, the electrolyte composition may include no, or substantially no, secondary conducting salt. In such examples, LiFSI may be the only conducting salt included in the electrolyte composition.

Employing LiFSI as the primary conducting salt may improve capacity retention of the lithium ion battery 100, as LiFSI may not generate hydrogen fluoride (HF) in side reactions with moisture which may be deleterious to battery performance. In this way, the electrolyte 110 may be more moisture tolerant and may maintain battery performance better as compared to an electrolyte that has LiPF$_6$ as the primary conducting salt, as excess LiPF$_6$ may generate hydrogen fluoride in a manner deleterious to battery performance. LiFSI and LiPF$_6$ may be included in the electrolyte 110 in a ratio selected to retain much of the battery performance benefits ascribed to LiFSI. For example, the primary conducting salt (e.g., LiFSI) may be 80 mol % or greater of all the conducting salts in the electrolyte composition (e.g., the primary and secondary conducting salts), such that sufficient LiFSI may be present to provide capacity retention benefits to the lithium ion battery 100. As such, the secondary conducting salt (e.g., LiPF$_6$) may be 20 mol % or less of all the conducting salts in the electrolyte composition.

In some examples, the primary conducting salt may be greater than 80 mol % of all the conducting salts in the electrolyte composition. In other examples, the primary conducting salt may be greater than 85 mol % of all the conducting salts in the electrolyte composition. In other examples, the primary conducting salt may be greater than 90 mol % of all the conducting salts in the electrolyte composition. In other examples, the primary conducting salt may be greater than 95 mol % of all the conducting salts in the electrolyte composition. In other examples, the primary conducting salt may be 100 mol % of all the conducting salts in the electrolyte composition (e.g., no secondary conducting salt may be present). In one example, the primary conducting salt may be about 80 mol % of all the conducting salts in the electrolyte composition (as used herein, "about" may refer to a numerical value having a tolerance or deviation of up to 5%). In another example, the primary conducting salt may be substantially exactly 80 mol % of all the conducting salts in the electrolyte composition.

In some examples, the secondary conducting salt may be less than 20 mol % of all the conducting salts in the electrolyte composition. In other examples, the secondary conducting salt may be less than 15 mol % of all the conducting salts in the electrolyte composition. In other examples, the secondary conducting salt may be less than 10 mol % of all the conducting salts in the electrolyte composition. In other examples, the secondary conducting salt may be less than 5 mol % of all the conducting salts in the electrolyte composition. In one example, the secondary conducting salt may be about 20 mol % of all the conducting salts in the electrolyte composition. In another example, the secondary conducting salt may be substantially exactly 20 mol % of all the conducting salts in the electrolyte composition.

The at least four additives may include a first additive, for example, VC. In some examples, the first additive may be present in the electrolyte composition at between 0.1 wt % and 10 wt %. In other examples, the first additive may be present in the electrolyte composition at between 0.2 wt % and 5 wt %. In other examples, the first additive may be present in the electrolyte composition at between 0.5 wt % and 2 wt %. In one example, the first additive may be VC and present in the electrolyte composition at between 0.5 wt % and 1.5 wt %.

The at least four additives may further include a second additive, for example, FEC. In some examples, the second additive may be present in the electrolyte composition at between 0.1 wt % and 10 wt %. In other examples, the second additive may be present in the electrolyte composition at between 0.2 wt % and 5 wt %. In other examples, the second additive may be present in the electrolyte composition at between 0.5 wt % and 2 wt %. In one example, the second additive may be FEC and present in the electrolyte composition at between 0.5 wt % and 1.5 wt %.

The at least four additives may further include a third additive, for example, PS. In some examples, the third additive may be present in the electrolyte composition at between 0.1 wt % and 10 wt %. In other examples, the third additive may be present in the electrolyte composition at between 0.2 wt % and 5 wt %. In other examples, the third additive may be present in the electrolyte composition at between 0.5 wt % and 2 wt %. In one example, the third additive may be PS and present in the electrolyte composition at between 0.5 wt % and 1.5 wt %.

The at least four additives may further include a fourth additive, for example, ES. In some examples, the fourth additive may be present in the electrolyte composition at between 0.1 wt % and 10 wt %. In other examples, the fourth additive may be present in the electrolyte composition at between 0.2 wt % and 5 wt %. In other examples, the fourth additive may be present in the electrolyte composition at between 0.5 wt % and 2 wt %. In one example, the fourth additive may be ES and present in the electrolyte composition at between 0.5 wt % and 1.5 wt %.

In some examples, the at least four additives may include one or more further additives in addition to VC, FEC, PC, and ES. For example, the at least four additives may further include a fifth additive, for example, DTD. In some examples, the fifth additive may be present in the electrolyte composition at between 0.1 wt % and 10 wt %. In other examples, the fifth additive may be present in the electrolyte composition at between 0.2 wt % and 5 wt %. In other examples, the fifth additive may be present in the electrolyte composition at between 0.2 wt % and 2 wt %. In one example, the fifth additive may be DTD and present in the electrolyte composition at between 0.5 wt % and 1.5 wt %.

The electrolyte 110 may be non-aqueous, in that each of the conducting salts and additives may be dissolved in a non-aqueous solvent. Specifically, the non-aqueous solvent may include one or more cyclic carbonate solvents and one or more linear carbonate solvents. The one or more cyclic carbonate solvents may include ethylene carbonate (EC) and propylene carbonate (PC). The one or more linear carbonate solvents may include diethyl carbonate (DEC), ethyl methyl carbonate (EMC), and dimethyl carbonate (DMC). In some examples, the non-aqueous solvent may further include one or more propionate derivative solvents such as ethyl propionate (EP) and/or methyl propionate (MP). The one or more propionate derivative solvents may increase the overall wettability and reduce the viscosity of the electrolyte 110, such that the electrolyte 110 may be suitable for low-temperature power applications. Other solvents may be included in the electrolyte 110 as known to one of at least ordinary skill in the art.

Figure 1B:
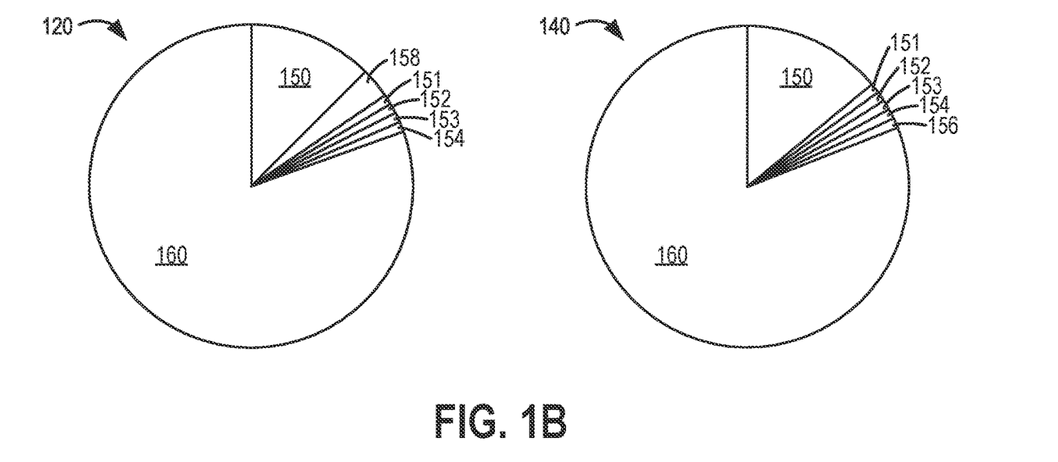
FIG. 1B shows plots depicting exemplary electrolyte compositions by weight.
Figure 2A:
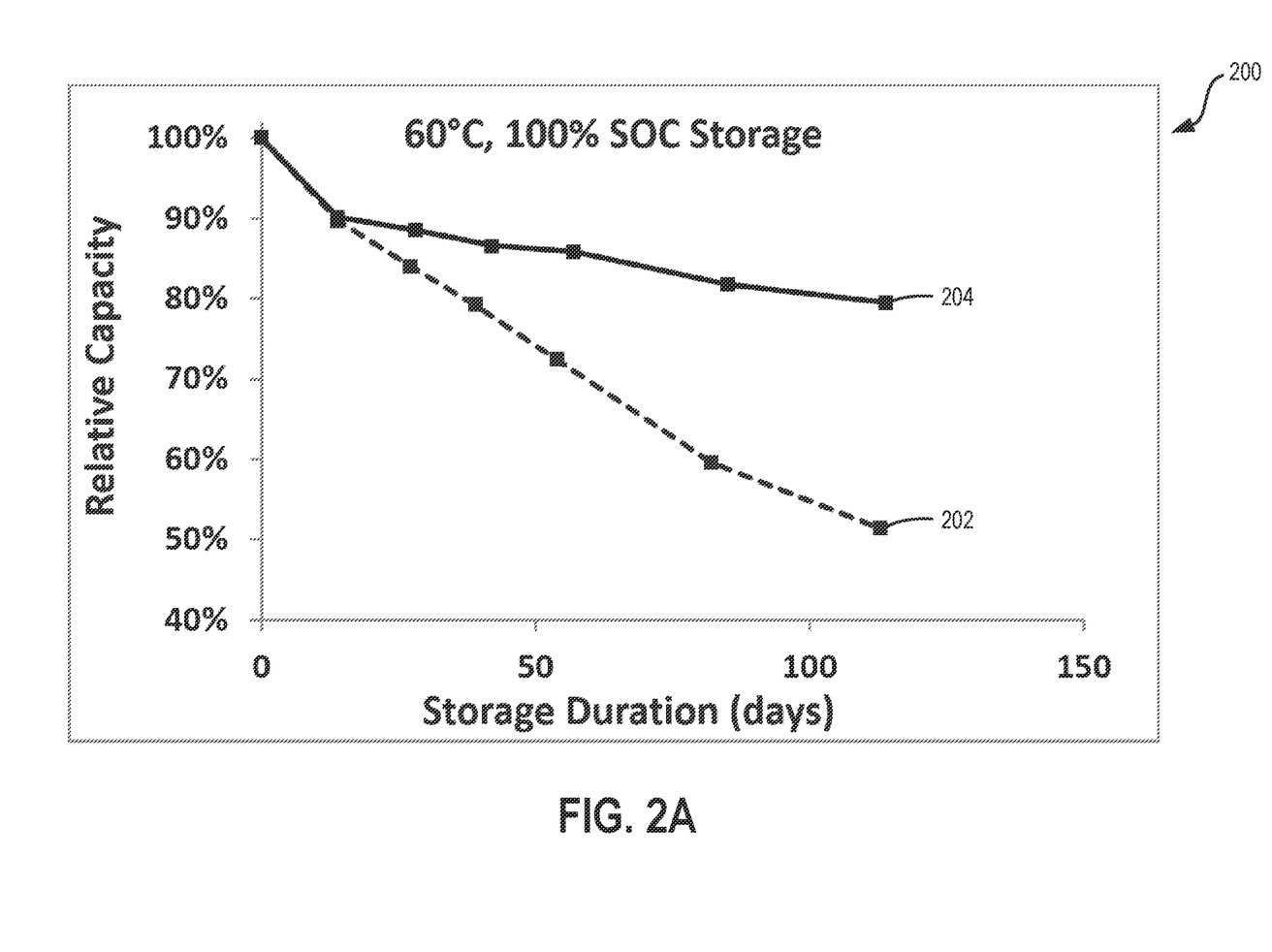
FIG. 2A shows a plot depicting relative capacities of exemplary lithium ion batteries during high-temperature storage at 100% state of charge.
Figure 2B:
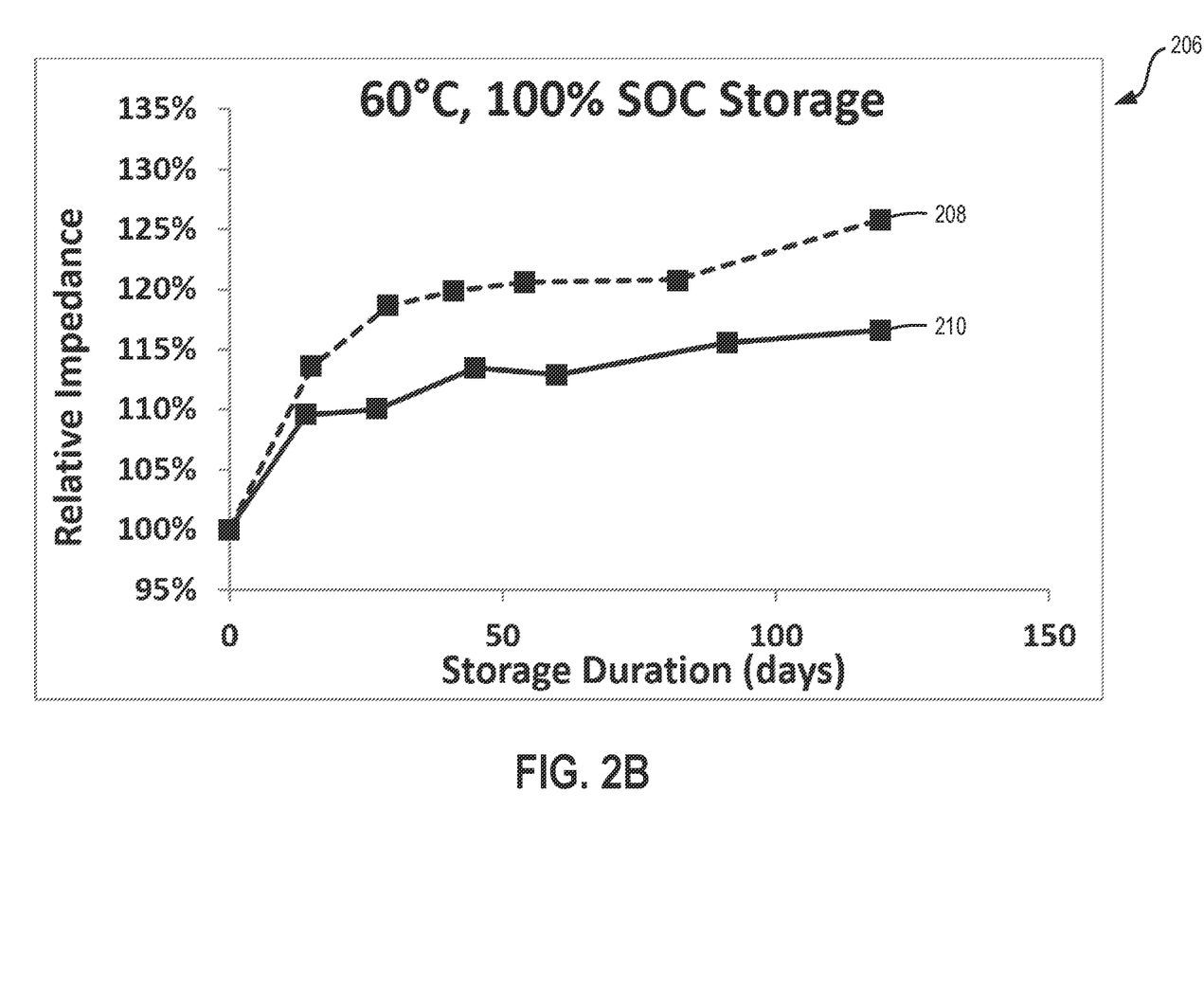
FIG. 2B shows a plot depicting relative impedances of exemplary lithium ion batteries during high-temperature storage at 100% state of charge.

Referring now to FIG. 1B, plots 120 and 140 depict exemplary electrolyte compositions for use in a lithium ion battery (e.g., 100). Each electrolyte composition may include LiFSI as a first conducting salt 150, VC as a first additive 151, FEC as a second additive 152, PS as a third additive 153, ES as a fourth additive 154, and a non-aqueous solvent 160; optionally, DTD as a fifth additive 156, and/or $LiPF_6$ as a second conducting salt 158 may further be included in the exemplary electrolyte compositions. Plots 120 and 140 further indicate relative amounts of the various components by weight, indicating that the conducting salts may be included in the exemplary electrolyte compositions in substantially greater amounts than the additives, and that the first, second, third, fourth, and fifth additives (e.g., 151, 152, 153, 154, and 156) may be included in substantially equivalent amounts.

For example, as shown by plot 120, a first electrolyte composition may include the first conducting salt 150 (e.g., LiFSI) at 10-15 wt %, the second conducting salt 158 (e.g., $LiPF_6$) at 1-5 wt %, the first additive 151 (e.g., VC) at 0.5-1.5 wt %, the second additive 152 (e.g., FEC) at 0.5-1.5 wt %, the third additive 153 (e.g., PS) at 0.5-1.5 wt %, the fourth additive 154 (e.g., ES) at 0.5-1.5 wt %, and the non-aqueous solvent 160, specifically including EMC at 30-50 wt %, EC at 20-30 wt %, PC at 0-10 wt %, and DEC at 0-10 wt %.

Exemplary electrolyte compositions may further include the fifth additive 156. For example, as shown by plot 140, a second electrolyte composition may include the first conducting salt 150 (e.g., LiFSI) at 12-16 wt %, the first additive 151 (e.g., VC) at 0.5-1.5 wt %, the second additive 152 (e.g., FEC) at 0.5-1.5 wt %, the third additive 153 (e.g., PS) at 0.5-1.5 wt %, the fourth additive 154 (e.g., ES) at 0.5-1.5 wt %, the fifth additive 156 (e.g., DTD) at 0.5-1.5 wt %, and the non-aqueous solvent 160, specifically including EMC at 30-50 wt %, EC at 20-30 wt %, DMC at 5-20 wt %, EP at 5-20 wt %, PC at 0-10 wt %, and DEC at 0-10 wt %.

The electrolyte compositions provided herein may confer distinct electrochemical benefits to a lithium ion battery (e.g., 100) by way of specific amounts of each component included therein and specific ratios between the components. For example, including small (e.g., 0.5-1.5 wt %), substantially equivalent amounts of each of VC, FEC, PS, and ES (e.g., additives 151, 152, 153, and 154) in the electrolyte compositions may provide the capacity retention and impedance benefits discussed in detail below with reference to FIGS. 2A and 2B, respectively. Such electrolyte compositions were unforeseen in the art, as only the complex combination of specific components in specific amounts resulted in the asserted technical advantages.

Preparation of a given electrolyte composition for use in a lithium ion battery (e.g., 100) is discussed in further detail below with reference to FIG. 3. Briefly, the electrolyte composition may be prepared in one or more mixing steps, including mixing each of LiFSI, VC, FEC, PS, and ES (each in particulate form), and optionally $LiPF_6$ and/or DTD (each in particulate form), in the non-aqueous solvent until each of the conducting salt(s) and additives are substantially dissolved. As such, in some examples, no filtration, sifting (e.g., for particle size control), or purification steps may be utilized in preparing the electrolyte composition. The empty volume of the lithium ion battery may then be filled with the electrolyte composition.

Referring now to FIG. 2A, a plot 200 depicts relative capacities of exemplary lithium ion batteries at substantially 100% SOC in high-temperature (about 60° C.) storage. Specifically, dashed curve 202 shows the relative capacity for a first lithium ion battery including an electrolyte having $LiPF_6$ as a primary (e.g., majority) conducting salt, and solid curve 204 shows the relative capacity for a second lithium ion battery including an electrolyte having the first electrolyte composition as described above with reference to FIG. 1B (e.g., having LiFSI as the primary conducting salt, $LiPF_6$ as the secondary conducting salt, and VC, FEC, PS, and ES as the additives).

Referring now to FIG. 2B, a plot 206 depicts relative impedances of exemplary lithium ion batteries at substantially 100% SOC in high-temperature (about 60° C.) storage. Specifically, dashed curve 208 shows the relative impedance for a first lithium ion battery including an electrolyte having $LiPF_6$ as a primary (e.g., majority) conducting salt, and solid curve 210 shows the relative impedance for a second lithium ion battery including an electrolyte having the first electrolyte composition as described above with reference to FIG. 1B (e.g., having LiFSI as the primary conducting salt, $LiPF_6$ as the secondary conducting salt, and VC, FEC, PS, and ES as the additives).

As shown by comparing solid curve 204 to dashed curve 202 in plot 200 of FIG. 2A, the relative capacity of the second lithium ion battery (e.g., including LiFSI and $LiPF_6$ as the conducting salts) decays more slowly than the relative capacity of the first lithium ion battery (e.g., including only $LiPF_6$ as the conducting salt) over a duration of greater than 100 days. As further shown by comparing solid curve 210 to dashed curve 208 in plot 206 of FIG. 2B, the relative impedance of the second lithium ion battery (e.g., including LiFSI and $LiPF_6$ as conducting salts) grows more slowly than the relative impedance of the first lithium ion battery (e.g., including only $LiPF_6$ as the conducting salt) over a duration of greater than 100 days. Such phenomena indicate that inclusion of LiFSI in combination with VC, FEC, PS, and ES may mitigate deleterious effects ascribed to hydrolysis of a $PF_6^-$ anion of $LiPF_6$ (such as occurs when $LiPF_6$ is included as the primary conducting salt, as in the first lithium ion battery). In some examples, the deleterious effects may include corrosion of a cathode current collector in the lithium ion battery due to HF generation from the hydrolysis of the $PF_6^-$ anions during high-temperature storage. In this way, improved lithium ion battery capacity retention may be imparted via the use of the specific electrolyte compositions provided herein as compared to similar batteries that rely on use of $LiPF_6$ as the primary conducting salt in combination with suboptimal additive ratios.

Figure 3:
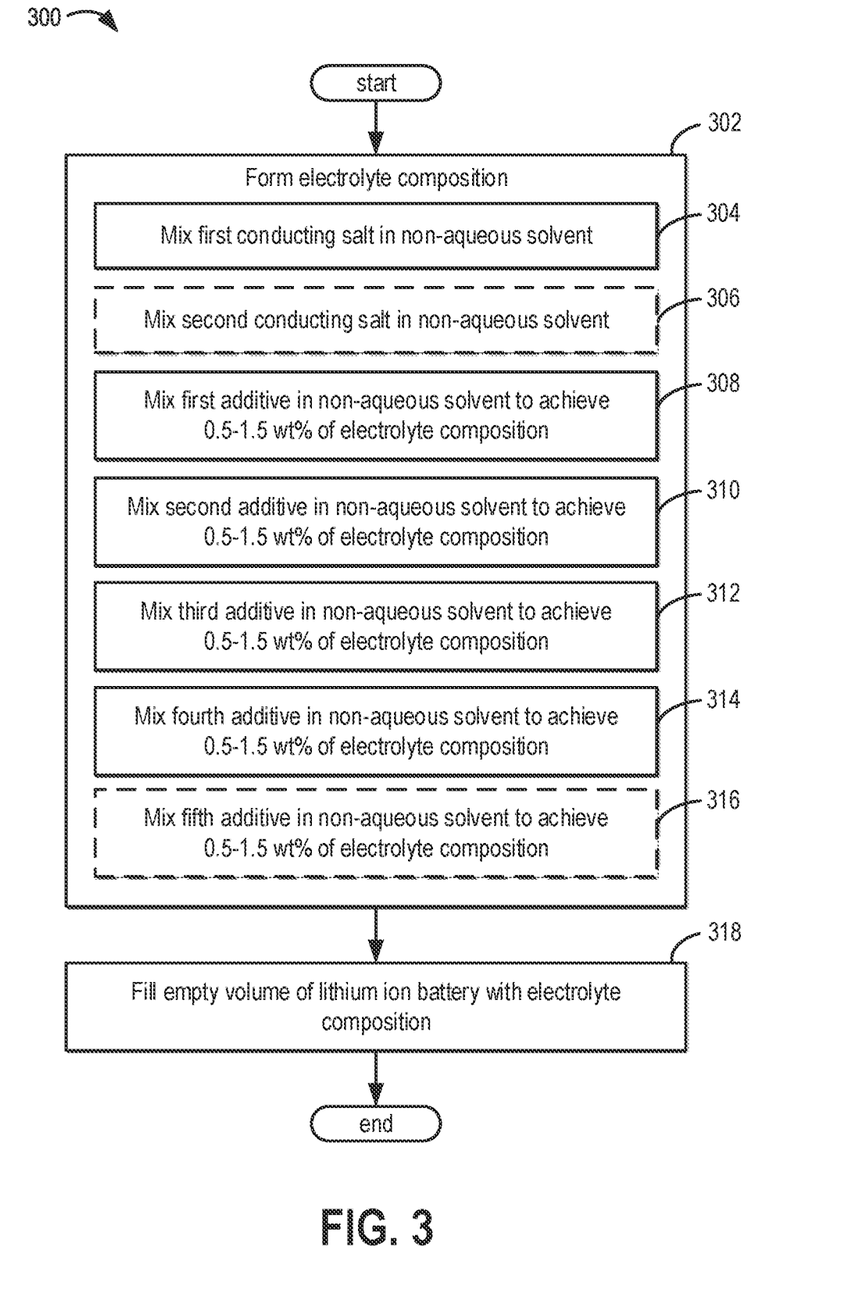
FIG. 3 shows a flow chart of a method for forming an exemplary electrolyte composition for use in a lithium ion battery.

Referring now to FIG. 3, a flow chart of a method 300 is depicted for forming an electrolyte composition for use in a lithium ion battery. Specifically, the electrolyte composition may be formed by dissolving at least a primary conducting salt and four additives in a non-aqueous solvent, whereby the electrolyte composition may then fill the empty volume of the lithium ion battery. It will be appreciated that the method 300 may be described in relation to the components described above with reference to FIGS. 1A and 1B. For example, the lithium ion battery may be the lithium ion battery 100 and the electrolyte composition may characterize the electrolyte 110.

At 302, the method 300 may include forming the electrolyte composition. Specifically, at 304, a first conducting salt may be mixed in the non-aqueous solvent until the first conducting salt is substantially dissolved in the non-aqueous solvent. The first conducting salt may be the primary conducting salt. That is, the first conducting salt may be a majority component (by molarity) of all the conducting salts included in the electrolyte composition. In some examples, the first conducting salt may be LiFSI.

At 306, a second conducting salt may optionally be mixed in the non-aqueous solvent until the second conducting salt is substantially dissolved in the non-aqueous solvent. The second conducting salt may be the secondary conducting salt. That is, the second conducting salt may be a minority component (by molarity) of all the conducting salts included in the electrolyte composition. For example, a molar ratio of the first conducting salt to the second conducting salt may be no lower than 4:1 (but may be higher than 4:1). In some examples, the second conducting salt may be $LiPF_6$.

At 308, a first additive may be mixed in the non-aqueous solvent until the first additive is substantially dissolved in the non-aqueous solvent. In some examples, the first additive may be added in an amount sufficient to form 0.5-1.5 wt % of the electrolyte composition as finally formed.

At 310, a second additive may be mixed in the non-aqueous solvent until the second additive is substantially dissolved in the non-aqueous solvent. In some examples, the second additive may be added in an amount sufficient to form 0.5-1.5 wt % of the electrolyte composition as finally formed.

At 312, a third additive may be mixed in the non-aqueous solvent until the third additive is substantially dissolved in the non-aqueous solvent. In some examples, the third additive may be added in an amount sufficient to form 0.5-1.5 wt % of the electrolyte composition as finally formed.

At 314, a fourth additive may be mixed in the non-aqueous solvent until the fourth additive is substantially dissolved in the non-aqueous solvent. In some examples, the fourth additive may be added in an amount sufficient to form 0.5-1.5 wt % of the electrolyte composition as finally formed.

The first through fourth additives may be selected from VC, FEC, PS and ES. However, once one additive is selected, then the additive may not be selected again. As a non-limiting example, in a case where the first additive is selected to be VC, then the second, third and fourth additives may not be VC (but instead may be selected from FEC, PS and ES). In such a case, if the second additive is then selected to be FEC, then the third and fourth additive may not be VC or FEC (but instead may be selected from PS and ES), and so on.

At 316, a fifth additive may optionally be mixed in the non-aqueous solvent until the fifth additive is substantially dissolved in the non-aqueous solvent. In some examples, the fifth additive may be DTD. In some examples, the fifth additive may be added in an amount sufficient to form 0.5-1.5 wt % of the electrolyte composition as finally formed.

The above described mixing steps may be performed in a vessel of any format sufficient for mixing desired volumes. In some examples, mixing may be conducted by hand-shaking or via mechanical shaking for 5 min or another duration of time, for example, 1 min, 10 min, 30 min, or 60 min. In some examples, the mixing may be conducted at a predetermined speed, for example 2000 RPM or at another speed of mixing, such as 1000 RPM, 1500 RPM, or 2500 RPM. A type of vessel and process of mixing used is not particularly limited and may be any known to one of ordinary skill in the art. It will be appreciated that mixing parameters may be varied according to a desired electrolyte composition. Furthermore, it may be understood that, in some examples, formation of the electrolyte composition may include a filtration step (for example, after step 316 of the method 300). However, in other examples, it may be understood that filtration may not be used, without departing from the scope of this disclosure.

As such, the electrolyte composition may be formed. As a first example, the electrolyte composition may include 1-5 wt % of $LiPF_6$, 10-15 wt % of LiFSI, 0.5-1.5 wt % of VC, 0.5-1.5 wt % of FEC, 0.5-1.5 wt % of PS, 0.5-1.5 wt % of ES, 30-50 wt % of EMC, 20-30 wt % of EC, 0-10 wt % of PC, and 0-10 wt % of DEC. As a second example, the electrolyte composition may include 12-16 wt % of LiFSI, 0.5-1.5 wt % of VC, 0.5-1.5 wt % of FEC, 0.5-1.5 wt % of PS, 0.5-1.5 wt % of ES, 0.5-1.5 wt % of DTD, 30-50 wt % of EMC, 20-30 wt % of EC, 5-20 wt % of DMC, 5-20 wt % of EP, 0-10 wt % of PC, and 0-10 wt % of DEC. It will be appreciated that numerous electrolyte compositions may be contemplated by one of at least ordinary skill in the art within the scope of the present disclosure. That is, the above described electrolyte compositions are merely exemplary and should not be construed as limiting the scope of the present disclosure.

At 318, the method 300 may include filling the empty volume of the lithium ion battery with the electrolyte composition. For example, a cathode, an anode, and a separator may be placed within a casing. The empty volume within the casing not occupied by the cathode, anode, or separator, as well as the pores of the cathode, anode and separator, may be filled with the electrolyte composition, such that each of the cathode, anode, and separator are immersed in the electrolyte composition. The casing may be hermetically sealed such that the cathode, anode, separator, and electrolyte composition are enclosed within the casing. The method 300 may then end.

In this way, an electrolytic composition is provided for a lithium ion battery. The electrolytic composition may include LiFSI as a primary conducting salt, partially or completely replacing $LiPF_6$ as the primary conducting salt. The technical effect of selecting LiFSI as the primary conducting salt is that deleterious side reactions involving $LiPF_6$ may be avoided. The electrolytic composition may further include specific amounts of VC, FEC, PS, and ES in weight ratios selected to maximize electrochemical benefits ascribed to use of LiFSI. In some examples, DTD may further be included as an additive in the electrolytic composition. The technical effect of such specific electrolytic compositions is that capacity decay in the lithium ion battery may be mitigated, especially during high-temperature storage at high SOC.

In one example, an electrolytic composition, comprising VC, FEC, PS, ES, and a conducting salt comprising no less than 80 mol % of LiFSI. A first example of the electrolytic composition further includes wherein the conducting salt comprises $LiPF_6$. A second example of the electrolytic composition, optionally including the first example of the electrolytic composition, further includes wherein $LiPF_6$ is 20 mol % or less of the conducting salt. A third example of the electrolytic composition, optionally including one or more of the first and second examples of the electrolytic composition, further includes wherein LiFSI is 100 mol % of the conducting salt. A fourth example of the electrolytic composition, optionally including one or more of the first through third examples of the electrolytic composition, further comprises DTD. A fifth example of the electrolytic composition, optionally including one or more of the first through fourth examples of the electrolytic composition, further includes wherein DTD is 0.5-1.5 wt % of the electrolytic composition. A sixth example of the electrolytic composition, optionally including one or more of the first through fifth examples of the electrolytic composition, further includes wherein LiFSI is 10-15 wt % of the electrolytic composition, and $LiPF_6$ is 1-5 wt % of the electrolytic composition. A seventh example of the electrolytic composition, optionally including one or more of the first through sixth examples of the electrolytic composition, further includes wherein LiFSI is 12-16 wt % of the electrolytic composition. An eighth example of the electrolytic composition, optionally including one or more of the first through seventh examples of the electrolytic composition, further includes wherein VC is 0.5-1.5 wt % of the electrolytic composition, FEC is 0.5-1.5 wt % of the electrolytic composition, PS is 0.5-1.5 wt % of the electrolytic composition, and ES is 0.5-1.5 wt % of the electrolytic composition. A ninth example of the electrolytic composition, optionally including one or more of the first through eighth examples of the electrolytic composition, further comprises a non-aqueous solvent selected from the group comprising EC, PC, DEC, EMC, DMC, EP, MP, and combinations thereof.

In another example, a lithium ion battery, comprising a cathode, an anode, a separator interposed between the cathode and the anode, and a non-aqueous electrolyte comprising one or more cyclic carbonate solvents, one or more linear carbonate solvents, VC, FEC, PS, ES, and a conducting salt, the conducting salt comprising no less than 80 mol % of LiFSI, wherein each of the cathode, the anode, and the separator are immersed in the non-aqueous electrolyte. A first example of the lithium ion battery further includes wherein the conducting salt further comprises $LiPF_6$. A second example of the lithium ion battery, optionally including the first example of the lithium ion battery, further includes wherein the non-aqueous electrolyte further comprises DTD. A third example of the lithium ion battery, optionally including one or more of the first and second examples of the lithium ion battery, further includes wherein the non-aqueous electrolyte further comprises one or more propionate derivative solvents.

In yet another example, a method, comprising forming an electrolyte composition, comprising mixing a first conducting salt in a non-aqueous solvent until the first conducting salt is substantially dissolved, where the first conducting salt is LiFSI and where the first conducting salt comprises no less than 80 mol % of all conducting salts in the electrolyte composition, mixing a first additive in the non-aqueous solvent until the first additive is substantially dissolved, mixing a second additive in the non-aqueous solvent until the second additive is substantially dissolved, mixing a third additive in the non-aqueous solvent until the third additive is substantially dissolved, and mixing a fourth additive in the non-aqueous solvent until the fourth additive is substantially dissolved, where the first through fourth additives each include one of VC, FEC, PS, and ES, and where none of the first through fourth additives are the same, and filling an empty volume of a lithium ion battery with the electrolyte composition. A first example of the method further includes wherein the non-aqueous solvent is selected from the group comprising EC, PC, DEC, EMC, DMC, EP, MP, and combinations thereof. A second example of the method, optionally including the first example of the method, further includes wherein forming the electrolyte composition further comprises mixing a second conducting salt in a non-aqueous solvent until the second conducting salt is substantially dissolved, where the second conducting salt is $LiPF_6$. A third example of the method, optionally including one or more of the first and second examples of the method, further includes wherein forming the electrolyte composition further comprises mixing a fifth additive in the non-aqueous solvent until the fifth additive is substantially dissolved, where the fifth additive is DTD. A fourth example of the method, optionally including one or more of the first through third examples of the method, further includes wherein the electrolyte composition comprises 10-15 wt % of the first conducting salt, 1-5 wt % of the second conducting salt, 0.5-1.5 wt % of the first additive, 0.5-1.5 wt % of the second additive, 0.5-1.5 wt % of the third additive, 0.5-1.5 wt % of the fourth additive, 30-50 wt % of a first component of the non-aqueous solvent, the first component being EMC, 20-30 wt % of a second component of the non-aqueous solvent, the second component being EC, 0-10 wt % of a third component of the non-aqueous solvent, the third component being PC, and 0-10 wt % of a fourth component of the non-aqueous solvent, the fourth component being DEC. A fifth example of the method, optionally including one or more of the first through fourth examples of the method, further includes wherein the electrolyte composition comprises 12-16 wt % of the first conducting salt, 0.5-1.5 wt % of the first additive, 0.5-1.5 wt % of the second additive, 0.5-1.5 wt % of the third additive, 0.5-1.5 wt % of the fourth additive, 0.5-1.5 wt % of the fifth additive, 30-50 wt % of the first component of the non-aqueous solvent, the first component being EMC, 20-30 wt % of the second component of the non-aqueous solvent, the second component being EC, 0-10 wt % of the third component of the non-aqueous solvent, the third component being PC, 0-10 wt % of the fourth component of the non-aqueous solvent, the fourth component being DEC, 5-20 wt % of a fifth component of the non-aqueous solvent, the fifth component being DMC, and 5-20 wt % of a sixth component of the non-aqueous solvent, the sixth component being EP.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electrolytic composition, comprising:
   0.2 wt. %-5 wt. % vinylene carbonate (VC);
   0.5 wt. %-2 wt. % fluoroethylene carbonate (FEC);
   0.1 wt. %-10 wt. % 1,3-propane sultone (PS);
   0.2 wt. %-5 wt. % ethylene sulfite (ES);
   0.5 wt. %-1.5 wt. % 1,3,2-dioxathiolane 2,2-dioxide (DTD); and
   a conducting salt comprising no less than 80 mol % of lithium bis(fluorosulfonyl)imide (LiFSI) and 20 mol % or less of lithium hexafluorophosphate (LiPF$_6$).

2. The electrolytic composition of claim 1, wherein the conducting salt comprises LiPF$_6$.

3. The electrolytic composition of claim 1, wherein LiFSI is 100 mol % of the conducting salt.

4. The electrolytic composition of claim 2, wherein LiFSI is 10-15 wt % of the electrolytic composition; and LiPF$_6$ is 1-5 wt % of the electrolytic composition.

5. The electrolytic composition of claim 1, wherein LiFSI is 12-16 wt % of the electrolytic composition.

6. The electrolytic composition of claim 1, wherein
   VC is 0.5-1.5 wt % of the electrolytic composition;
   FEC is 0.5-1.5 wt % of the electrolytic composition;
   PS is 0.5-1.5 wt % of the electrolytic composition; and
   ES is 0.5-1.5 wt % of the electrolytic composition.

7. The electrolytic composition of claim 1, further comprising a non-aqueous solvent selected from the group comprising ethylene carbonate (EC), propylene carbonate (PC), diethyl carbonate (DEC), ethyl methyl carbonate (EMC), dimethyl carbonate (DMC), ethyl propionate (EP), methyl propionate (MP), and combinations thereof.

8. A lithium ion battery, comprising:
   a cathode;
   an anode;
   a separator interposed between the cathode and the anode; and
   a non-aqueous electrolyte comprising one or more cyclic carbonate solvents, one or more linear carbonate solvents, vinylene carbonate, fluoroethylene carbonate, 1,3-propane sultone, ethylene sulfite, 1,3,2-dioxathiolane 2,2-dioxide, and a conducting salt, the conducting salt including a first conducting salt and a second conducting salt, wherein a molar ratio of the first conducting salt to the second conducting salt is no less than 4:1, and wherein the first conducting salt is lithium bis(fluorosulfonyl)imide and the second conducting salt is lithium hexafluorophosphate, wherein the vinylene carbonate, fluoroethylene carbonate, 1,3-propane sultone, 1,3,2-dioxathiolane 2,2-dioxide, and ethylene sulfite are included in substantially equivalent amounts by weight, and wherein 1,3,2-dioxathiolane 2,2-dioxide is included in an amount of 0.5 wt. %-1.5 wt. %;
   wherein each of the cathode, the anode, and the separator are immersed in the non-aqueous electrolyte.

9. The lithium ion battery of claim 8, wherein the conducting salt further comprises LiPF$_6$.

10. The lithium ion battery of claim 8, wherein the non-aqueous electrolyte further comprises one or more propionate derivative solvents.

11. A method, comprising:
    forming an electrolyte composition, comprising:
    mixing a first conducting salt in a non-aqueous solvent until the first conducting salt is dissolved, where the first conducting salt is lithium bis(fluorosulfonyl)imide (LiFSI) and where the first conducting salt comprises no less than 80 mol % of all conducting salts in the electrolyte composition;
    mixing a second conducting salt in a non-aqueous solvent until the second conducting salt is dissolved, where the second conducting salt is lithium hexafluorophosphate (LiPF$_6$) and the second conductive salt comprises 20 mol % or less of all conducting salts in the electrolyte composition;
    mixing a first additive in the non-aqueous solvent until the first additive is dissolved;
    mixing a second additive in the non-aqueous solvent until the second additive is dissolved;
    mixing a third additive in the non-aqueous solvent until the third additive is dissolved;
    mixing a fourth additive in the non-aqueous solvent until the fourth additive is dissolved;
    mixing a fifth additive in the non-aqueous solvent until the fifth additive is dissolved,
    wherein the first through fifth additives each include one of vinylene carbonate (VC), fluoroethylene carbonate (FEC), 1,3-propane sultone (PS), 1,3,2-dioxathiolane 2,2-dioxide (DTD), and ethylene sulfite (ES), and where none of the first through fifth additives are the same and wherein the non-aqueous solvent comprises 30-50 wt. % ethyl methyl carbonate, 20-30 wt. % ethylene carbonate, 0-10 wt. % propylene carbonate, and 0-10 wt. % diethyl carbonate, and
    wherein the electrolyte composition comprises:

12-16 wt. % of the first conducting salt;
0.5-1.5 wt. % of the first additive;
0.5-1.5 wt. % of the second additive;
0.5-1.5 wt. % of the third additive;
0.5-1.5 wt. % of the fourth additive; and
0.5-1.5 wt. % of the fifth additive; and
filling an empty volume of a lithium ion battery with the electrolyte composition.

12. The method of claim 11, wherein the non-aqueous solvent is further selected from the group comprising ethyl methyl carbonate (EMC), dimethyl carbonate (DMC), ethyl propionate (EP), methyl propionate (MP), and combinations thereof.

13. The method of claim 11, wherein the electrolyte composition comprises:
5-20 wt. % of dimethyl carbonate (DMC); and
5-20 wt. % of ethyl propionate (EP).

* * * * *